(12) United States Patent
Sun et al.

(10) Patent No.: US 12,430,089 B1
(45) Date of Patent: Sep. 30, 2025

(54) ELECTRONIC DEVICE AND METHOD TO DECREASE TOUCH DELAY BASED ON SCENE CONFIGURATION

(71) Applicant: MediaTek Singapore Pte. Ltd., Singapore (SG)

(72) Inventors: JianWei Sun, Beijing (CN); QiuShi Liu, Beijing (CN); Qian Dong, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 18/891,327

(22) Filed: Sep. 20, 2024

(51) Int. Cl.
*G06F 3/14* (2006.01)
(52) U.S. Cl.
CPC .................................. *G06F 3/14* (2013.01)
(58) Field of Classification Search
CPC ....... G09G 2340/0435; G09G 2360/18; G09G 5/12; G09G 5/363; G09G 5/18; G09G 2360/12; G06T 1/60; G06F 3/14; G06F 9/544; G06F 3/041
See application file for complete search history.

(56) References Cited

FOREIGN PATENT DOCUMENTS

| CN | 111367434 A | * | 7/2020 | .......... G06F 3/0412 |
| CN | 119311235 A | * | 1/2025 | .......... G06F 3/0421 |

* cited by examiner

*Primary Examiner* — Koosha Sharifi-Tafreshi
(74) *Attorney, Agent, or Firm* — McClure, Qualey & Rodack, LLP

(57) ABSTRACT

An electronic device includes a display, a buffer, and a processor. The buffer has a queue depth. The processor is electrically connected to the buffer and the display, queues a data frame that has been rendered into the buffer at buffer queue time, dequeues the data frame from the buffer at buffer dequeue time and displays the data frame on the display at synchronous trigger time. The processor monitors display process information and calculates display rhythm information based on the display process information, generates a frame rhythm adjustment command based on the display rhythm information and configuration settings, and adjusts the rhythm of the data frame according to the display rhythm information and the frame rhythm adjustment command. The display process information includes the synchronous trigger time, the queue depth, the buffer queue time, and the buffer dequeue time.

20 Claims, 13 Drawing Sheets

ELECTRONIC DEVICE AND METHOD TO DECREASE TOUCH DELAY BASED ON SCENE CONFIGURATION

BACKGROUND OF THE INVENTION

Field of the Invention

The present invention relates to an electronic device, and, in particular, to an electronic device and a method to decrease touch delay based on scene configuration.

Description of the Related Art

The timeliness of touch response is a key factor in determining the playability and competitiveness of a game. There are many factors that affect touch delay, involving a long link, among which display latency accounts for a large proportion of the total touch delay. Therefore, reducing display latency has become the main optimization strategy to improve touch response speed.

For example, in a mobile operating system, the system display service relies on the Vsync signal to trigger the processing of the content that the application needs to display. In order to lower input delay and increase the frame rate, the drawing rhythm of game applications does not refer to the Vsync signal. Therefore, there will be inconsistencies in the rhythm between game applications and display services, causing a backlog in the cache queue of the system display service, thereby increasing display delay. Different types of games and different game scenarios have different latency requirements, and latency handling strategies will also be different.

BRIEF SUMMARY OF THE INVENTION

An embodiment of the present invention provides an electronic device. The electronic device includes a display, a buffer, and a processor. The buffer has a queue depth. The processor is electrically connected to the buffer and the display, queues a data frame that has been rendered into the buffer at buffer queue time, dequeues the data frame from the buffer at buffer dequeue time and displays the data frame on the display at synchronous trigger time. The processor monitors display process information and calculates display rhythm information based on the display process information, generates a frame rhythm adjustment command based on the display rhythm information and configuration settings, and adjusts the rhythm of the data frame according to the display rhythm information and the frame rhythm adjustment command. The display process information includes the synchronous trigger time, the queue depth, the buffer queue time, and the buffer dequeue time. The display rhythm information includes a display velocity, a queue velocity, and a time difference between the buffer dequeue time and the buffer queue time.

According to the electronic device described above, the processor monitors a synchronous signal to obtain the synchronous trigger time, and obtains a buffer queue name, the queue depth, the buffer queue time, and the buffer dequeue time through the application programming interface (API) of the buffer.

According to the electronic device described above, the processor calculates the display velocity using the following equation:

$$V_{display} = (N-1) \bigg/ \sum_{i=1}^{n} (T_n vsync - T_{n-1} vsync);$$

$V_{display}$ is the display velocity, N is the number of data frames that the processor calculates, n is an nth data frame, $T_n vsync$ is the synchronous trigger time in the nth data frame, and $T_{n-1} vsync$ is the synchronous trigger time in the n−1th data frame.

According to the electronic device described above, the processor calculates the queue velocity using the following equation:

$$V_{queue} = (N-1) \bigg/ \sum_{i=1}^{n} (T_n queue - T_{n-1} queue);$$

$V_{queue}$ is the queue velocity, N is the number of data frames that the processor calculates, n is an nth data frame, $T_n queue$ is the buffer queue time in the nth data frame, and $T_{n-1} queue$ is the buffer queue time in the n−1th data frame.

According to the electronic device described above, the processor parses an XML configuration to read the configuration settings, monitors an update of the configuration settings, receives the display process information and the display rhythm information, selects a window rhythm control strategy, and generates the frame rhythm adjustment command; wherein the configuration settings include application scenes, rhythm status, judgment conditions, thresholds, and adjustment methods.

According to the electronic device described above, the adjustment methods include a computility control method, a pending control method, and a drop control method.

According to the electronic device described above, the processor identifies an application window through the buffer queue name to match the window rhythm control strategy in the configuration settings, and selects the adjustment methods for the current application scenes according to the window rhythm control strategy and the rhythm status.

According to the electronic device described above, the window rhythm control strategy includes a default strategy, a smooth strategy, a low latency strategy, and a custom strategy.

According to the electronic device described above, when the default strategy is adopted and the processor detects that the display velocity is equal to the queue velocity, the processor starts the computility control method to increase the computing frequency of the processor when the time difference between the buffer dequeue time and the buffer queue time is changed.

According to the electronic device described above, when the default strategy is adopted and the processor detects that the display velocity is higher than the queue velocity, the processor starts the pending control method to decrease the queue velocity when the queue depth exceeds the depth threshold.

According to the electronic device described above, when the default strategy is adopted and the processor detects that the display velocity is higher than the queue velocity, the processor first starts the drop control method to drop some of the data frames in the buffer, and second starts the pending control method to decrease the queue velocity when a frame consumed period of the data frame is higher than a consumed period threshold.

According to the electronic device described above, when the smooth strategy is adopted and the processor detects that the display velocity is not equal to the queue velocity, the processor starts the pending control method to decrease the queue velocity when the queue depth exceeds the depth threshold.

According to the electronic device described above, when the smooth strategy is adopted and the processor detects that the display velocity is equal to the queue velocity, the processor starts the computility control method to increase the computing frequency of the processor when the time difference between the buffer dequeue time and the buffer queue time is higher than a time difference threshold.

An embodiment of the present invention also provides a method to decrease touch delay based on scene configuration. The method is applied to an electronic device including a display, a buffer, and a processor. The method includes the following steps. A data frame that has been rendered is queued into the buffer at buffer queue time. The data frame is dequeued from the buffer at buffer dequeue time. The data frame is displayed on the display at synchronous trigger time. Display process information is monitored and Display rhythm information is calculated based on the display process information. The display process information includes the synchronous trigger time, a queue depth of the buffer, the buffer queue time, and the buffer dequeue time. The display rhythm information includes a display velocity, a queue velocity, and a time difference between the buffer dequeue time and the synchronous trigger time. A frame rhythm adjustment command is generated based on the display rhythm information and configuration settings. The rhythm of the data frame is adjusted according to the display rhythm information and the frame rhythm adjustment command.

According to the method described above, the step of monitoring the display process information includes the following steps. A synchronous signal is monitored to obtain the synchronous trigger time. A buffer queue name, the queue depth, the buffer queue time, and the buffer dequeue time are obtained through the application programming interface (API) of the buffer.

The method further includes the following step. The display velocity is calculated using the following equation:

$$V_{display} = (N-1) \bigg/ \sum_{i=1}^{n}(T_n vsync - T_{n-1} vsync).$$

$V_{display}$ is the display velocity, N is the number of data frames that the processor calculates, n is an nth data frame, $T_n vsync$ is the synchronous trigger time in the nth data frame, and $T_{n-1} vsync$ is the synchronous trigger time in the n−1th data frame.

The method further includes the following step. The queue velocity is calculated using the following equation:

$$V_{queue} = (N-1) \bigg/ \sum_{i=1}^{n}(T_n queue - T_{n-1} queue).$$

$V_{queue}$ is the queue velocity, N is the number of data frames that the processor calculates, n is an nth data frame, $T_n$queue is the buffer queue time in the nth data frame, and $T_{n-1}$queue is the buffer queue time in the n−1th data frame.

According to the method described above, the step of generating the frame rhythm adjustment command based on the display rhythm information and configuration settings includes the following steps. An XML configuration is parsed to read the configuration settings. An update of the configuration settings is monitored. The display process information and the display rhythm information are received. A window rhythm control strategy is selected. The frame rhythm adjustment command is generated. The configuration settings include application scenes, rhythm status, judgment conditions, thresholds, and adjustment methods.

According to the method described above, the adjustment methods include a computility control method, a pending control method, and a drop control method.

According to the method described above, the steps of selecting the window rhythm control strategy and generating the frame rhythm adjustment command include the following steps. An application window is identified through the buffer queue name to match the window rhythm control strategy in the configuration settings. The adjustment methods for the current application scenes is selected according to the window rhythm control strategy and the rhythm status. The window rhythm control strategy includes a default strategy, a smooth strategy, a low latency strategy, and a custom strategy.

The method further includes the following step. The default strategy is adopted. It is detected that the display velocity is equal to the queue velocity. It is detected that the time difference between the buffer dequeue time and the synchronous trigger time is changed. The computility control method is started to increase the computing frequency of the processor.

The method further includes the following step. The default strategy is adopted. It is detected that the display velocity is higher than the queue velocity. It is detected that the queue depth exceeds the depth threshold. The pending control method is started to decrease the queue velocity.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
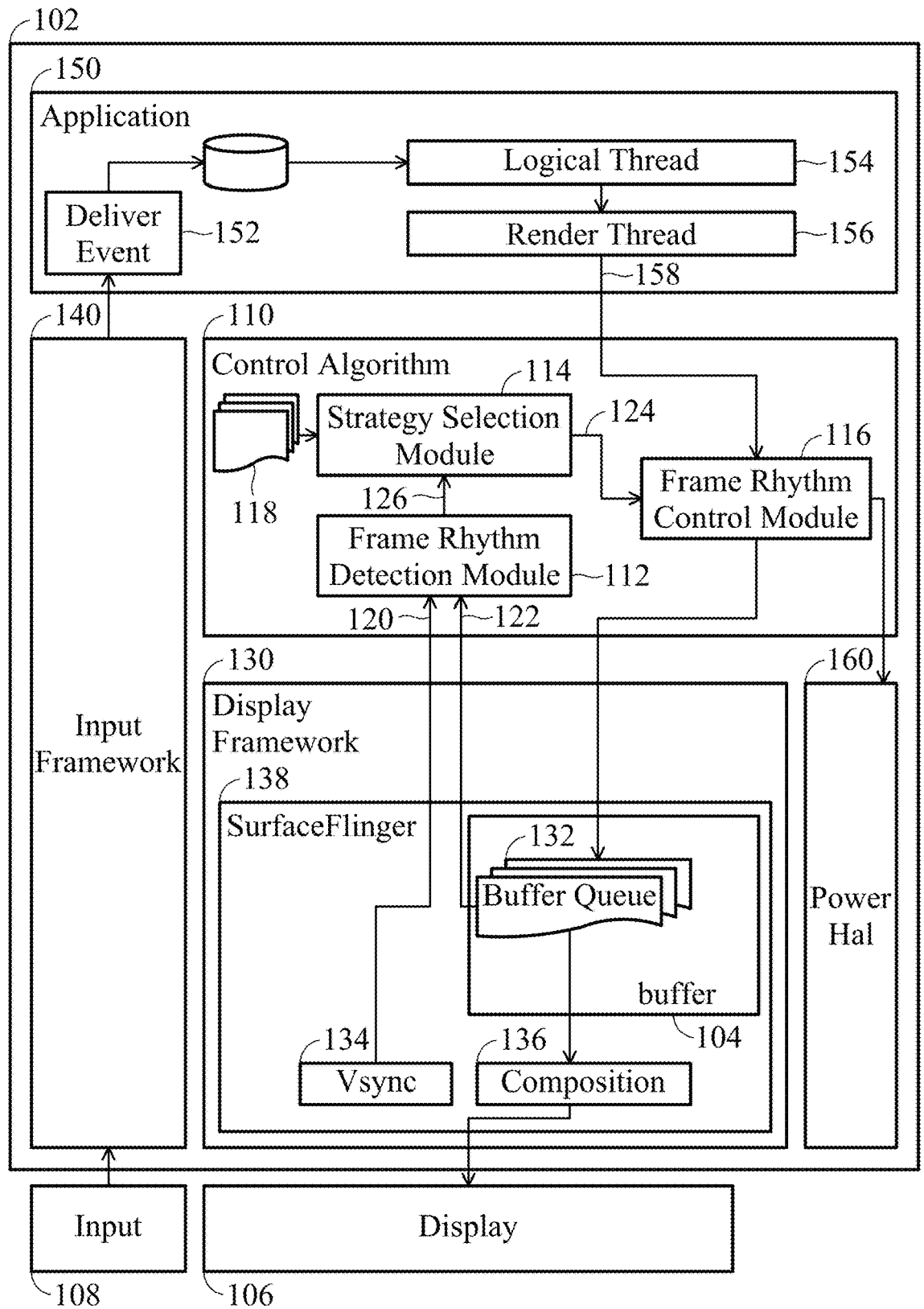
FIG. 1 shows a schematic diagram of an electronic device 100 in accordance with some embodiments of the present invention.

In order to make the above purposes, features, and advantages of some embodiments of the present invention more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" or "include" used in the present invention are used to indicate the existence of specific technical features, values, method steps, operations, units or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present invention. Regarding the drawings, the drawings show the general characteristics of methods, structures, or materials used in specific embodiments. However, the drawings should not be construed as defining or limiting the scope or properties encompassed by these embodiments. For example, for clarity, the relative size, thickness, and position of each layer, each area, or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", and "third" are used to describe components. They are not used to indicate the priority order of or advance relationship, but only to distinguish components with the same name.

It should be noted that the technical features in different embodiments described in the following can be replaced, recombined, or mixed with one another to constitute another embodiment without depart in from the spirit of the present invention.

FIG. 1 shows a schematic diagram of an electronic device 100 in accordance with some embodiments of the present invention. As shown in FIG. 1, the electronic device 100 includes a processor 102, a buffer 104, a display 106, and an input device 108. In some embodiments, the electronic device 100 may be a laptop, a tablet, or a smart phone, but the present invention is not limited thereto. The buffer 104 has a queue depth. The processor 102 executes a control algorithm 110 to form a frame rhythm detection module 112, a strategy selection module 114, and a frame rhythm control module 116. In some embodiments, the processor 102 also executes corresponding driving codes to form a display framework 130, an input framework 140, and a power hal 160. In some embodiments, the display framework 130 includes SurfaceFlinger 138. The processor 102 also executes an application 150 to receive operations from a user. The application 150 includes a logical thread 154, and a render thread 156. The render thread 156 renders a data frame, and sends a data frame 158 that has been rendered to the frame rhythm control module 116. The frame rhythm control module 116 bypasses the data frame 158 that has been rendered to the buffer 104 that includes a buffer queue 132. The processor 102 is electrically connected to the buffer 104, the display 106, and the input device 108. In some embodiments, the buffer 104 is included in the processor 102, but the present invention is not limited thereto.

In some embodiments, the processor 102 (for example, the application 150) queues the data frame 158 that has been rendered into the buffer 104 at buffer queue time. The processor 102 (for example, the SurfaceFlinger 138) dequeues the data frame 158 from the buffer 104 at buffer dequeue time and displays the data frame 158 on the display 106 at synchronous trigger time 120 through a composition function 136. The frame rhythm detection module 112 executed in the processor 102 monitors display process information and calculates display rhythm information 126 based on the display process information. In some embodiments, the display process information includes the synchronous trigger time 120 and queue information 122. The queue information 122 includes the queue depth of the buffer 104, the buffer queue time, and the buffer dequeue time. The strategy selection module 114 generates a frame rhythm adjustment command 124 based on the display rhythm information 126 and configuration settings (config) 118. The display rhythm information 126 includes a display velocity, a queue velocity, and a time difference between the buffer dequeue time and the synchronous trigger time 120.

In some embodiments, the frame rhythm detection module 112 calculates the display velocity using the following equation.

$$V_{display} = (N-1) / \sum_{i=1}^{n} (T_n vsync - T_{n-1} vsync).$$

$V_{display}$ is the display velocity, N is the number of data frames that the processor calculates, n is an nth data frame, $T_n vsync$ is the synchronous trigger time in the nth data frame, and $T_{n-1} vsync$ is the synchronous trigger time in the n−1th data frame.

In some embodiments, the frame rhythm detection module 112 calculates the queue velocity using the following equation.

$$V_{queue} = (N-1) / \sum_{i=1}^{n} (T_n queue - T_{n-1} queue).$$

$V_{queue}$ is the queue velocity, N is the number of data frames that the processor calculates, n is an nth data frame, $T_n queue$ is the buffer queue time in the nth data frame, and $T_{n-1} queue$ is the buffer queue time in the n−1th data frame.

The frame rhythm control module 116 executed in the processor 102 adjusts the rhythm of the data frame 158 according to the display rhythm information 126 and the frame rhythm adjustment command 124. In some embodiments, the frame rhythm control module 116 also sends a control command to the power hal 160 to decrease the computing frequency of the processor 102. In some embodiments, the frame rhythm detection module 112 executed in the processor 102 monitors the synchronous signal (Vsync) 134 to obtain the synchronous trigger time 120, and obtains a buffer queue name, the queue depth, the buffer queue time, and the buffer dequeue time through the application programming interface (API) of the buffer 104. In some embodiments, the input framework 140 receives an input command from the input device 108 operated by the user, and sends the input command to the application 150. The application 150 generates a deliver event 152 based on the input command. After processing by the logical thread 154 and the render thread 156, the data frame 158 that has been rendered is generated.

Figure 2:
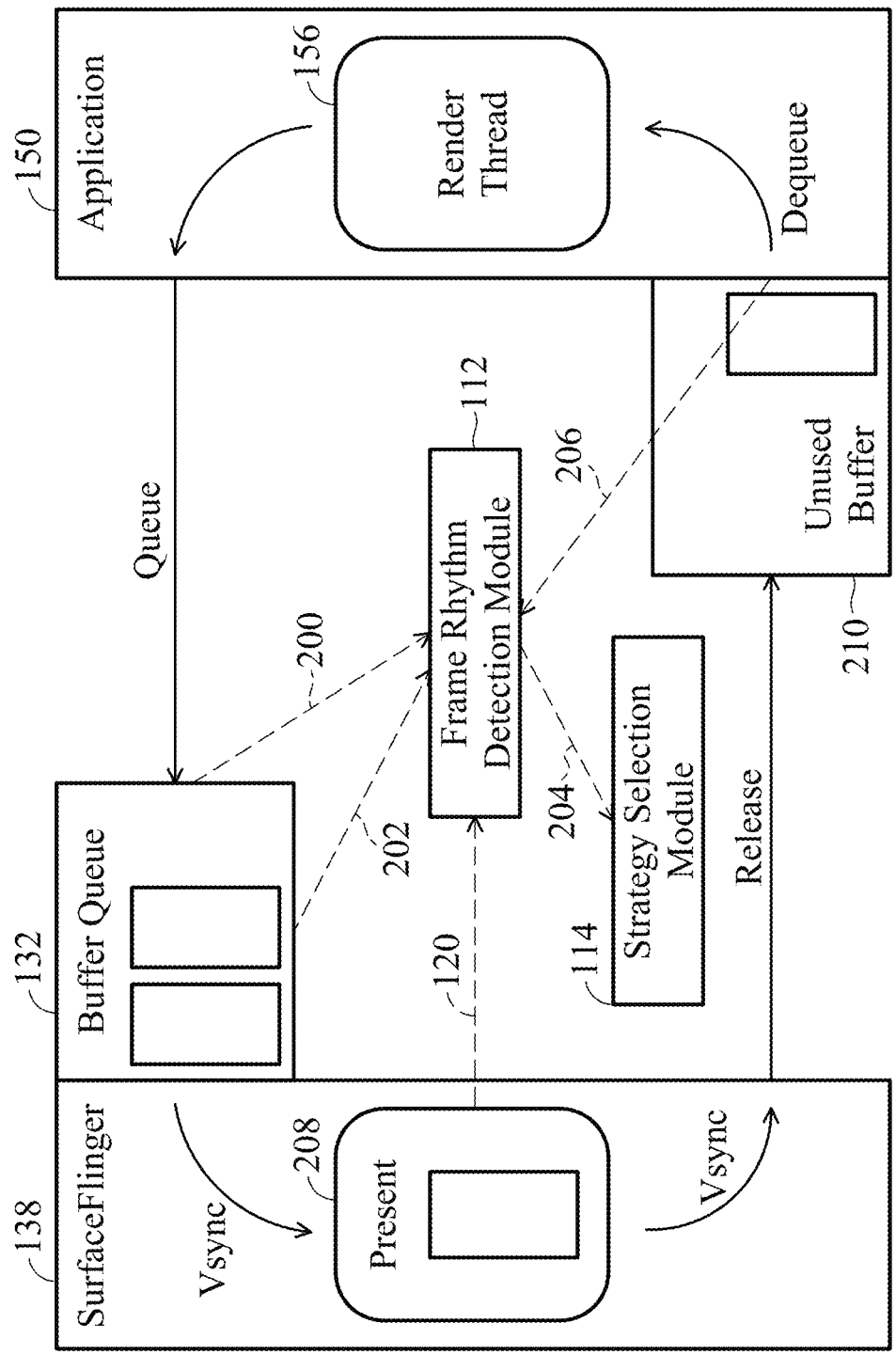
FIG. 2 shows a schematic diagram of a frame rhythm detection module 112 executed in a processor 102 in the electronic device 100 in FIG. 1 in accordance with some embodiments of the present invention.

FIG. 2 shows a schematic diagram of the frame rhythm detection module 112 executed in the processor 102 in the electronic device 100 in FIG. 1 in accordance with some embodiments of the present invention. As shown in FIG. 2, the application 150 first queues a data frame (for example, the data frame 158 in FIG. 1) that has been rendered into the buffer queue 132 in the buffer 104 at buffer queue time 200. The frame rhythm detection module 112 monitors the buffer queue time 200 and a queue depth 202 of the buffer queue 132. The frame rhythm detection module 112 monitors a synchronous signal Vsync to obtain the synchronous trigger time 120. The SurfaceFlinger 138 dequeues or releases a present data frame 208 from the buffer queue 132 at buffer dequeue time 206 and displays the data frame present data frame 208 on the display 106 at the synchronous trigger time 120. The frame rhythm detection module 112 also monitors the buffer dequeue time 206. After that, the frame rhythm detection module 112 calculates display rhythm information 204 (for example, the display rhythm information 126 in FIG. 1) based on the synchronous trigger time 120, the buffer queue time 200, the queue depth 202 of the buffer queue 132, and the buffer dequeue time 206. The display rhythm information 204 is then sent to the strategy selection module 114. After the present data frame 208 is released from the buffer queue 132, the application 150 obtains the unused buffer space 210 and queues the next data frame into the unused buffer space 210.

Figure 3:
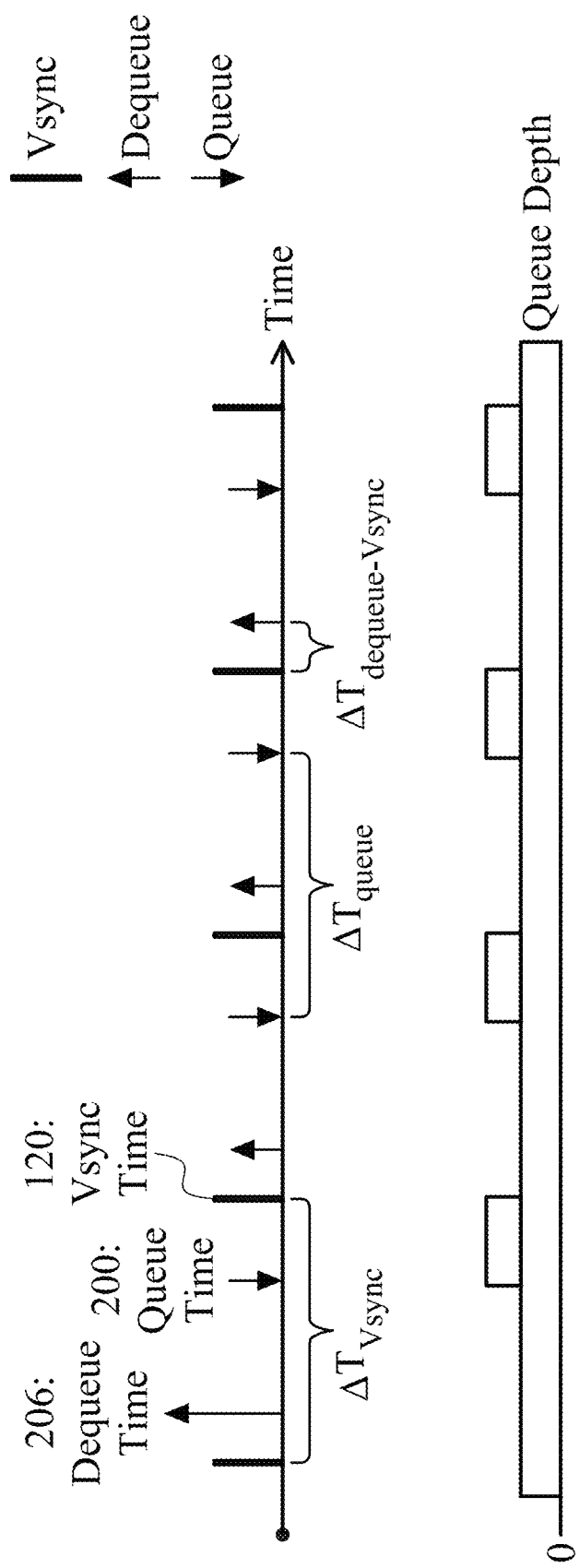
FIG. 3 shows a time sequence diagram of a display process done by the electronic device 100 in FIG. 1 in accordance with some embodiments of the present invention.

FIG. 3 shows a time sequence diagram of a display process done by the electronic device 100 in FIG. 1 in accordance with some embodiments of the present invention. As shown in FIG. 3, the upper portion of FIG. 3 illustrates the time sequence diagram of the display process. Multiple vertical solid lines represent periods of the synchronous trigger time 120 (that is, Vsync Time in FIG. 3). Multiple up arrows represent periods of the buffer dequeue time 206. Multiple down arrows represent periods of the buffer queue time 200. A time difference $\Delta T_{Vsync}$ between two adjacent synchronous trigger time 120 is defined. A time difference $\Delta T_{queue}$ between two adjacent buffer queue time 200 is defined. A time difference $\Delta T_{dequeue-Vsync}$ between the buffer dequeue time 206 and the synchronous trigger time 120 is defined. As shown in FIG. 3, after buffer queue time 200 and before the synchronous trigger time 120 in every period, since the application 150 queues a data frame that has been rendered into the buffer queue 132, the queue depth 202 is increased from 1 to 2. After the synchronous trigger time 120 in every period, since SurfaceFlinger 138 displays the data frame on the display 106, the queue depth 202 is decreased from 2 to 1. The queue depth 202 remains 1 after the synchronous trigger time 120 and before the buffer queue time 200 every period.

Figure 4:
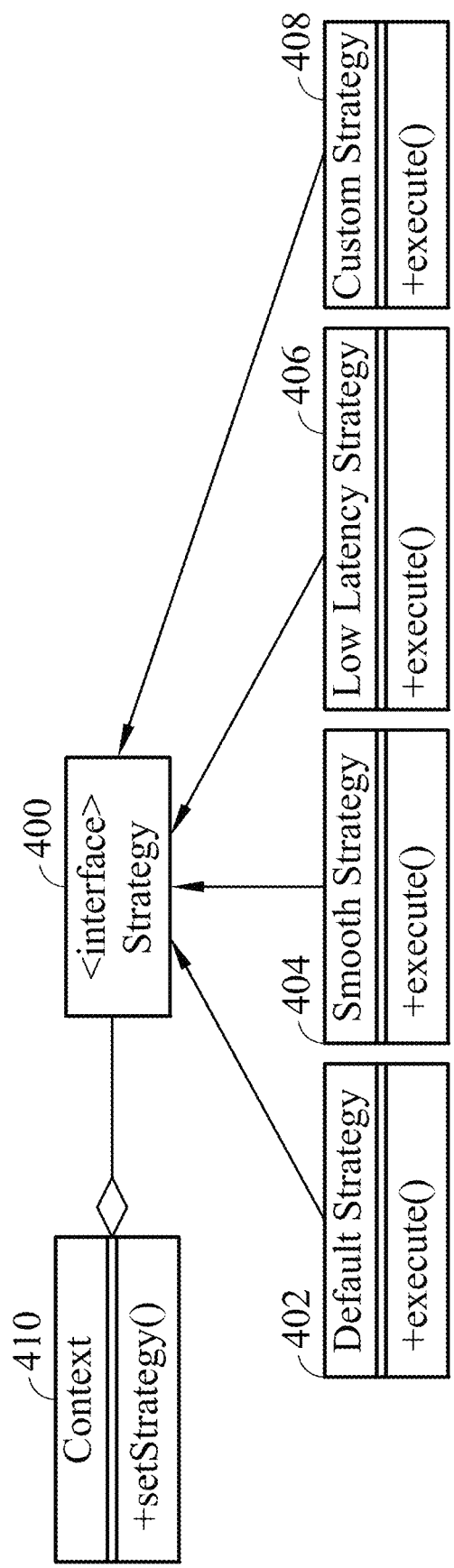
FIG. 4 shows a schematic diagram of multiple strategies selected by the strategy selection module 114 executed in the processor 102 in the electronic device 100 in FIG. 1 in accordance with some embodiments of the present invention.

FIG. 4 shows a schematic diagram of multiple strategies selected by the strategy selection module 114 executed in the processor 102 in the electronic device 100 in FIG. 1 in accordance with some embodiments of the present invention. Please refer to FIG. 1 at the same time. The strategy selection module 114 generates the frame rhythm adjustment command 124 based on the display rhythm information 126 and the configuration settings 118. The configuration settings 118 in FIG. 1 include application scenes, rhythm status, judgment conditions, thresholds, and adjustment methods, which are all recorded in a context 410 in FIG. 4. In some embodiments, the context 410 may be an XML document, but the present invention is not limited thereto. The application scenes, the rhythm status, the judgment conditions, the thresholds, and the adjustment methods may be different when different strategy 400 is executed or selected by the strategy selection module 114. In some embodiments, the strategy 400 may include a default strategy 402, a smooth strategy 404, a low latency strategy 406, and a custom strategy 408, but the present invention is not limited thereto.

Figure 5:
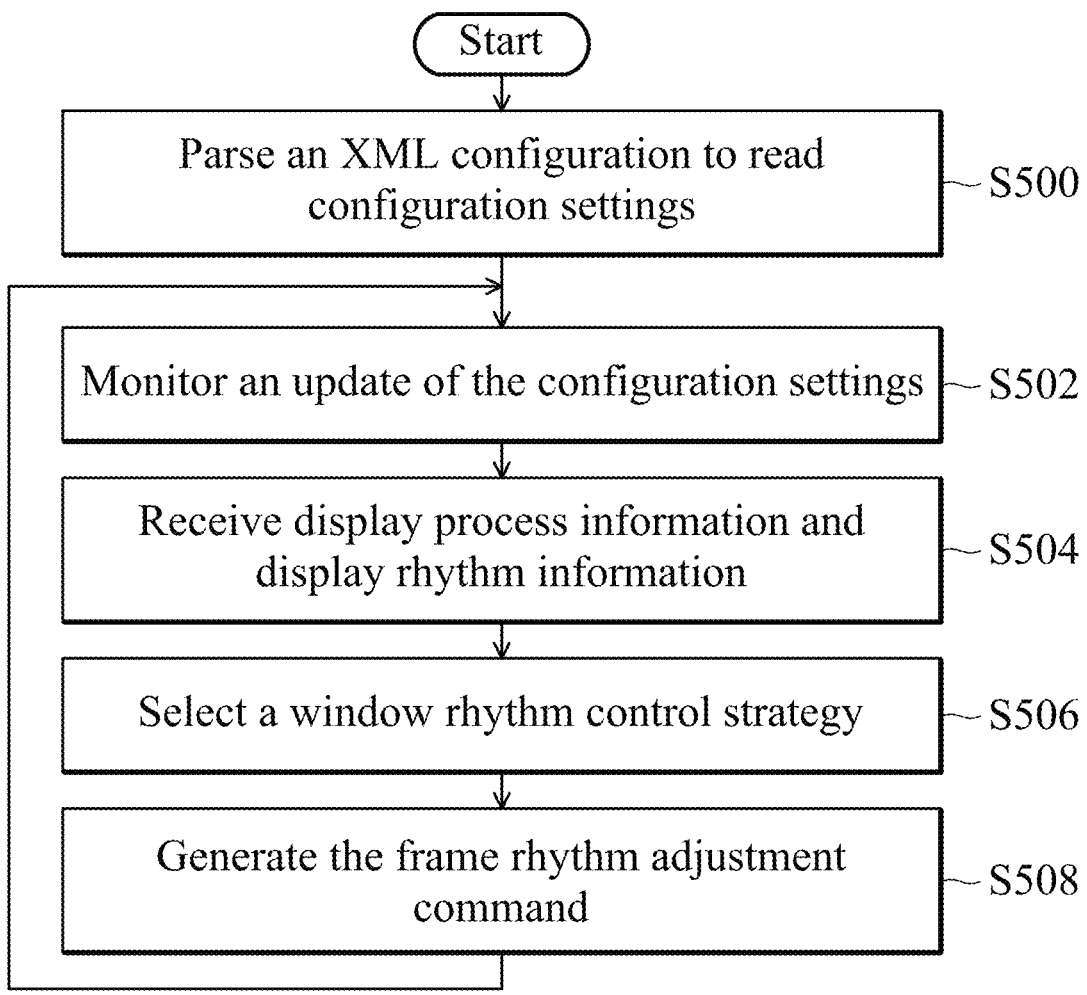
FIG. 5 shows a flow chart of operations of the strategy selection module 114 executed in the processor 102 in the electronic device 100 in FIG. 1 in accordance with some embodiments of the present invention.

FIG. 5 shows a flow chart of operations of the strategy selection module 114 executed in the processor 102 in the electronic device 100 in FIG. 1 in accordance with some embodiments of the present invention. As shown in FIG. 5, the strategy selection module 114 parses an XML configuration (for example, the context 410 in FIG. 4) to read the configuration settings (step S500), monitors an update of the configuration settings (step S502), and receives display process information (for example, including the synchronous trigger time 120 and queue information 122) and the display rhythm information (for example, the display rhythm information 126 or 204) (step S504). The strategy selection module 114 then selects a window rhythm control strategy (step S506), for example, the default strategy 402, the smooth strategy 404, the low latency strategy 406, or the custom strategy 408, but the present invention is not limited thereto. After that, the strategy selection module 114 generates the frame rhythm adjustment command (for example, the frame rhythm adjustment command 124) (step S508).

In some embodiments of steps 500 and 502, the configuration settings include the application scenes, the rhythm status, the judgment conditions, the thresholds, and the adjustment methods. In some embodiments, the adjustment methods include a computility control method, a pending control method, and a drop control method. In some embodiments of steps 506 and 508, the strategy selection module 114 identifies an application window through the buffer queue name to match the window rhythm control strategy in the configuration settings, and selects the adjustment methods for the current application scenes according to the window rhythm control strategy and the rhythm status.

In some embodiments, when the default strategy 402 is adopted and the processor 102 detects that the display velocity $V_{display}$ is equal to the queue velocity $V_{queue}$, the processor 102 starts the computility control method to increase the computing frequency of the processor 102 when the time difference $\Delta T_{dequeue\text{-}Vsync}$ between the buffer dequeue time and the synchronous trigger time is changed.

In some embodiments, when the default strategy 402 is adopted and the processor 102 detects that the display velocity $V_{display}$ is higher than the queue velocity $V_{queue}$, the processor 102 starts the pending control method to decrease the queue velocity $V_{queue}$ when the queue depth exceeds the depth threshold.

In some embodiments, when the default strategy 402 is adopted and the processor 102 detects that the display velocity $V_{display}$ is higher than the queue velocity $V_{queue}$, the processor 102 first starts the drop control method to drop some of the data frames in the buffer 104, and second starts the pending control method to decrease the queue velocity $V_{queue}$ when a frame consumed period of the data frame is higher than a consumed period threshold.

In some embodiments, when the smooth strategy 404 is adopted and the processor 102 detects that the display velocity $V_{display}$ is not equal to the queue velocity $V_{queue}$, the processor 102 starts the pending control method to decrease the queue velocity $V_{queue}$ when the queue depth exceeds the depth threshold.

In some embodiments, when the smooth strategy 404 is adopted and the processor 102 detects that the display velocity $V_{display}$ is equal to the queue velocity $V_{queue}$, the processor 102 starts the computility control method to increase the computing frequency of the processor 102 when the time difference $\Delta T_{dequeue\text{-}Vsync}$ between the buffer dequeue time and the synchronous trigger time is higher than a time difference threshold.

Figure 6:
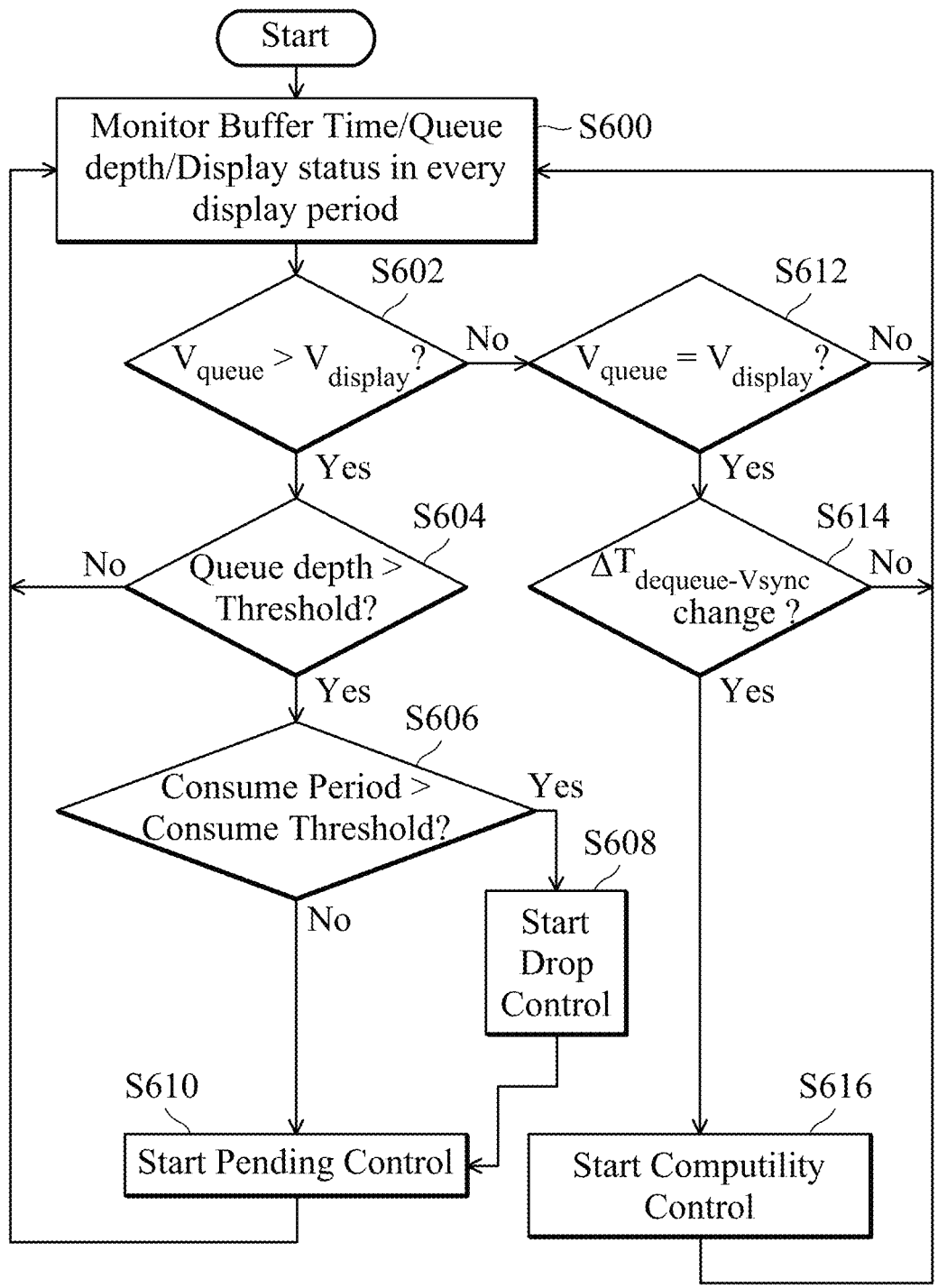
FIG. 6 shows a flow chart of operations of the frame rhythm detection module 112, the strategy selection module 114 and a frame rhythm control module 116 when a default strategy is adopted in accordance with some embodiments of the present invention.

FIG. 6 shows a flow chart of operations of the frame rhythm detection module 112, the strategy selection module 114, and the frame rhythm control module 116 when the default strategy is adopted in accordance with some embodiments of the present invention. As shown in FIG. 6, the frame rhythm detection module 112 monitors buffer time, including the buffer dequeue time (for example, the buffer dequeue time 206) and the buffer queue time (for example, the buffer queue time 200), the queue depth of the buffer 104, and a display status, including the rhythm status, in every display period. In step S602, the strategy selection module 114 determines whether the queue velocity $V_{queue}$ is higher than the display velocity $V_{display}$. If the answer in step S602 is yes, the strategy selection module 114 determines whether the queue depth exceeds the depth threshold in step S604. If the answer in step S604 is yes, the strategy selection module 114 determines whether a frame consumed period of the data frame is higher than a consumed period threshold in step S606. If the answer in step S606 is yes, the frame rhythm control module 116 starts a drop control method in step S608. After that, the frame rhythm control module 116 starts a pending control method in step S610 to decrease the queue velocity $V_{queue}$. After the pending control method is executed, the frame rhythm detection module 112 keeps executes step S600.

In some embodiments, if the answer in step S602 is no, the strategy selection module 114 determines whether the queue velocity $V_{queue}$ is equal to the display velocity $V_{display}$ in step S612. If the answer in step S612 is yes, the strategy selection module 114 determines whether the time difference $\Delta T_{dequeue\text{-}Vsync}$ between the buffer dequeue time and the synchronous trigger time is changed in step S614. If the answer in step S614 is yes, the frame rhythm control module 116 starts a computility control method in step S616 to increase the computing frequency of the processor 102. After the computility control method is executed, the frame rhythm detection module 112 keeps executes step S600.

In some embodiments, if the answer in step S604 is no, the frame rhythm detection module 112 keeps executes step S600. In some embodiments, if the answer in step S606 is no, the frame rhythm control module 116 starts the pending control method in step S610 to decrease the queue velocity $V_{queue}$. After the pending control method is executed, the frame rhythm detection module 112 keeps executes step S600. In some embodiments, if the answer in step S612 is no, the frame rhythm detection module 112 keeps executes step S600. In some embodiments, if the answer in step S614 is no, the frame rhythm detection module 112 keeps executes step S600.

Figure 7:
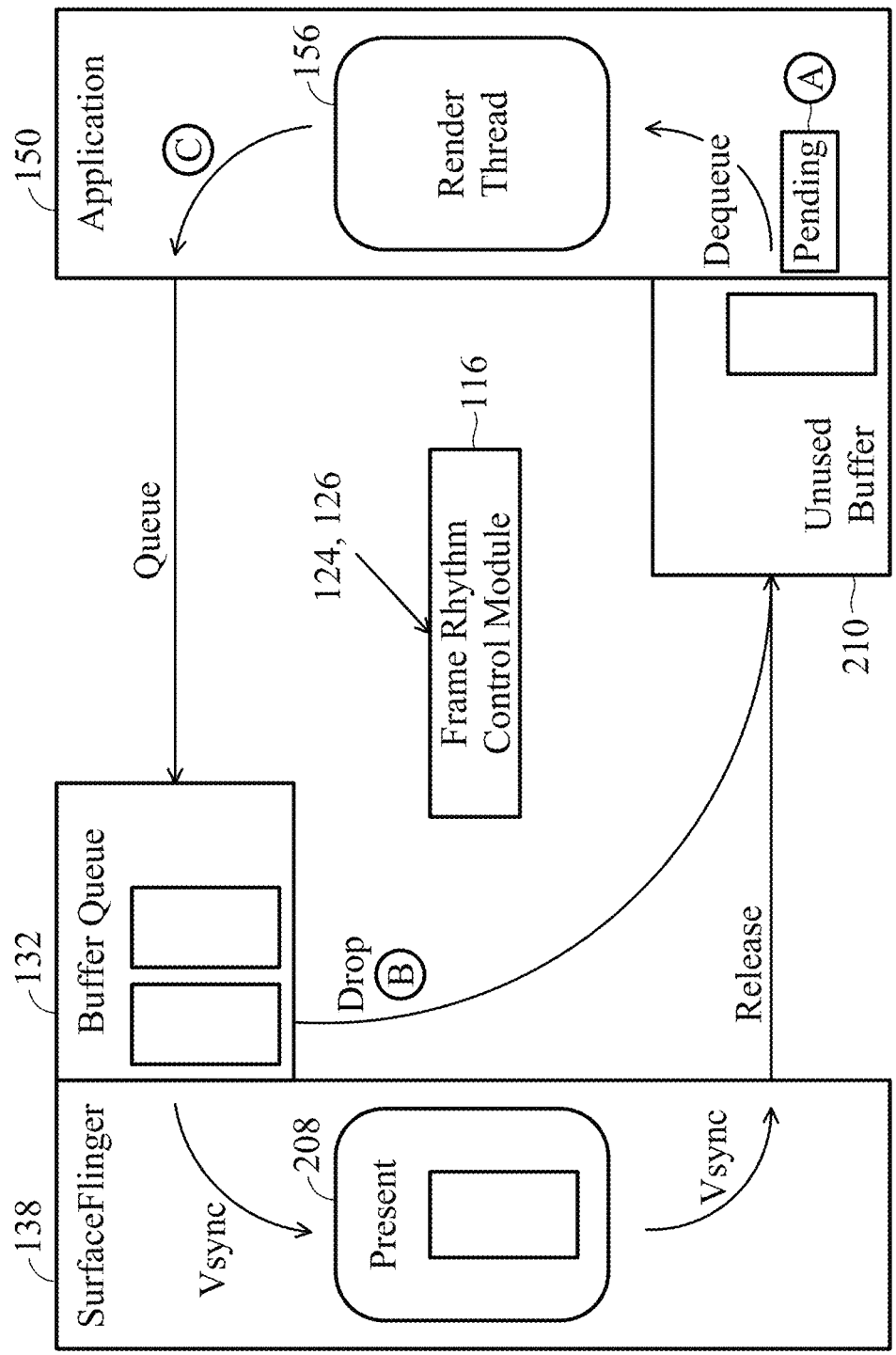
FIG. 7 shows a schematic diagram of the frame rhythm control module 116 executed in the processor 102 in the electronic device 100 in FIG. 1 in accordance with some embodiments of the present invention.

FIG. 7 shows a schematic diagram of the frame rhythm control module 116 executed in the processor 102 in the electronic device 100 in FIG. 1 in accordance with some embodiments of the present invention. As shown in FIG. 7, the frame rhythm control module 116 executes the pending control method A, the drop control method B, and/or the computility control method C based on the frame rhythm adjustment command 124 from the strategy selection module 114 and the display rhythm information 126 from the frame rhythm detection module 112. The display rhythm information 126 includes the display velocity V display, the queue velocity $V_{queue}$, and the time difference $\Delta T_{dequeue\text{-}Vsync}$ between the buffer dequeue time 206 and the synchronous trigger time 120. In some embodiments, the frame rhythm control module 116 starts the pending control method A to decrease the queue velocity $V_{queue}$. The frame rhythm control module 116 starts the drop control method B to drop some of the data frames in the buffer 104, so that the buffer depth of the buffer 104 may be decreased. The frame rhythm control module 116 starts the computility control method C to increase or decrease the computing frequency of the processor 102.

Figure 8:
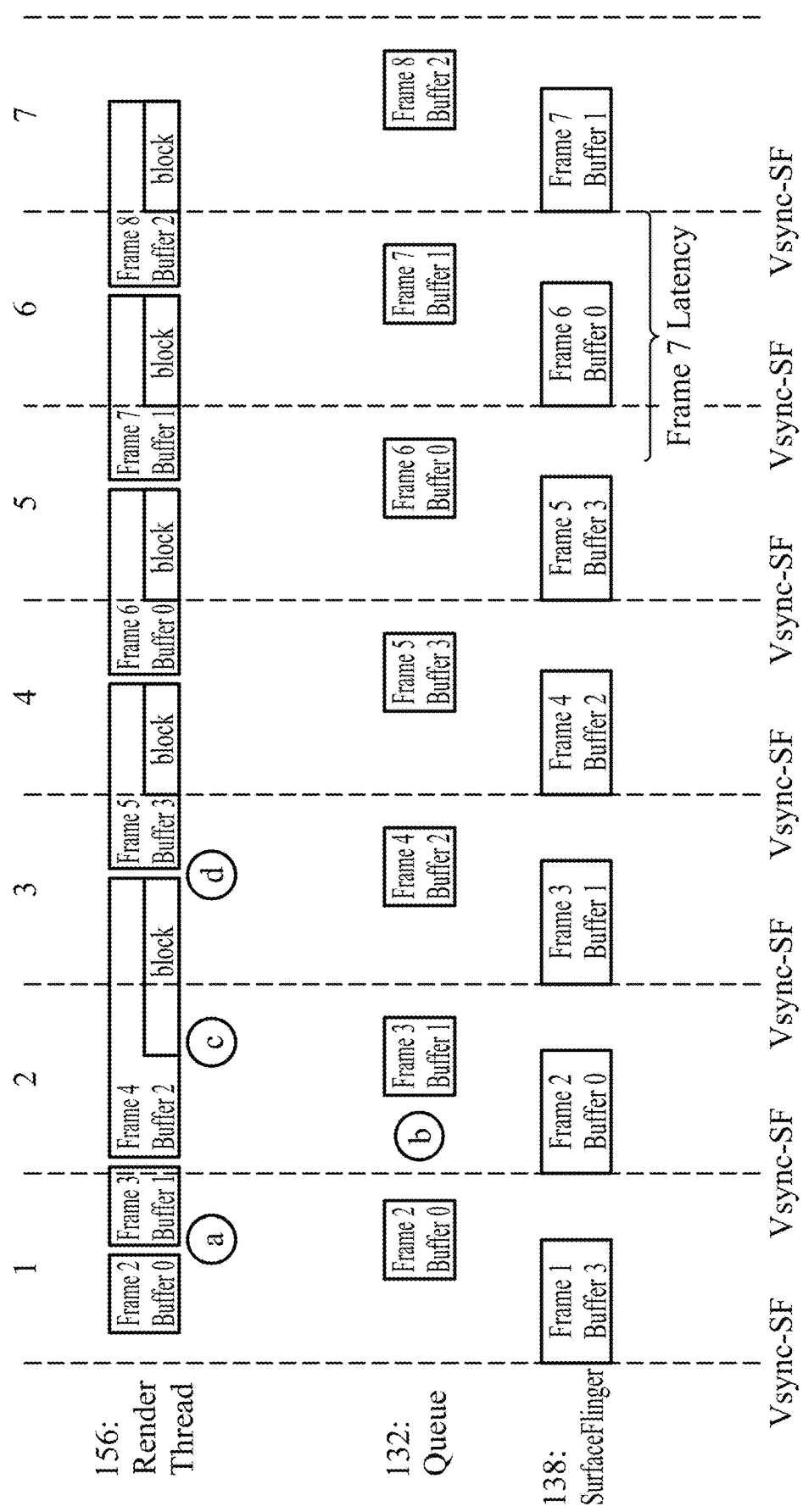
FIG. 8 shows a time sequence diagram of the frame rhythm control module 116 executing a pending control method in accordance with some embodiments of the present invention.

FIG. 8 shows a time sequence diagram of the frame rhythm control module 116 executing a pending control method in accordance with some embodiments of the present invention. As shown in FIG. 8, in period 1, the Surface-Flinger 138 dequeues Frame 1 from Buffer 3 of the buffer queue 132. Then, the render thread 156 of the application 150 queues Frame 2 in Buffer 0 of the buffer queue 132. The strategy selection module 114 detects that the queue velocity $V_{queue}$ is higher than the display velocity $V_{display}$ in an action in period 1. In period 2, the SurfaceFlinger 138 dequeues Frame 2 from Buffer 0 of the buffer queue 132. The render thread 156 of the application 150 queues Frame 3 in Buffer 1 of the buffer queue 132. Then, the strategy selection module 114 determines whether to start the adjustment methods (for example, the pending control method) based on the queue depth of the buffer queue 132 being higher than the depth threshold or not in an action b. In an action c, the frame rhythm control module 116 blocks the Frame 4 in periods 2 and 3 to decrease the queue velocity $V_{queue}$ and avoid increasing the queue depth of the buffer queue 132.

In period 3, the SurfaceFlinger 138 dequeues Frame 3 from Buffer 1 of the buffer queue 132. The render thread 156 of the application 150 queues Frame 4 in Buffer 2 of the buffer queue 132. In an action d, the frame rhythm control module 116 stops blocking Frame 4 in right time. In period 4, the SurfaceFlinger 138 dequeues Frame 4 from Buffer 2 of the buffer queue 132. The render thread 156 of the application 150 queues Frame 5 in Buffer 3 of the buffer queue 132. The frame rhythm control module 116 blocks the Frame 5 in period 4 to decrease the queue velocity $V_{queue}$ and avoid increasing the queue depth of the buffer queue 132. In period 5, the SurfaceFlinger 138 dequeues Frame 5 from Buffer 3 of the buffer queue 132. The render thread 156 of the application 150 queues Frame 6 in Buffer 0 of the buffer queue 132. The frame rhythm control module 116 blocks the Frame 6 in period 5 to decrease the queue velocity $V_{queue}$ and avoid increasing the queue depth of the buffer queue 132. It is noticed that the render thread 156 of the application 150 starts to render Frame 7 in period 5.

In period 6, the SurfaceFlinger 138 dequeues Frame 6 from Buffer 0 of the buffer queue 132. The render thread 156 of the application 150 queues Frame 7 in Buffer 1 of the buffer queue 132. The frame rhythm control module 116 blocks the Frame 7 in period 6 to decrease the queue velocity $V_{queue}$ and avoid increasing the queue depth of the buffer queue 132. In period 7, the SurfaceFlinger 138 dequeues Frame 7 from Buffer 1 of the buffer queue 132. The render thread 156 of the application 150 queues Frame 8 in Buffer 2 of the buffer queue 132. The frame rhythm control module 116 blocks the Frame 8 in period 7 to decrease the queue velocity $V_{queue}$ and avoid increasing the queue depth of the buffer queue 132. Since the queue velocity $V_{queue}$ is decreased, the queue velocity $V_{queue}$ may be match to the display velocity $V_{display}$. Furthermore, the Frame 7 latency which is obviously improved is marked out. Without starting the pending control method, the queue depth of the buffer queue 132 may become higher and higher.

Figure 9:
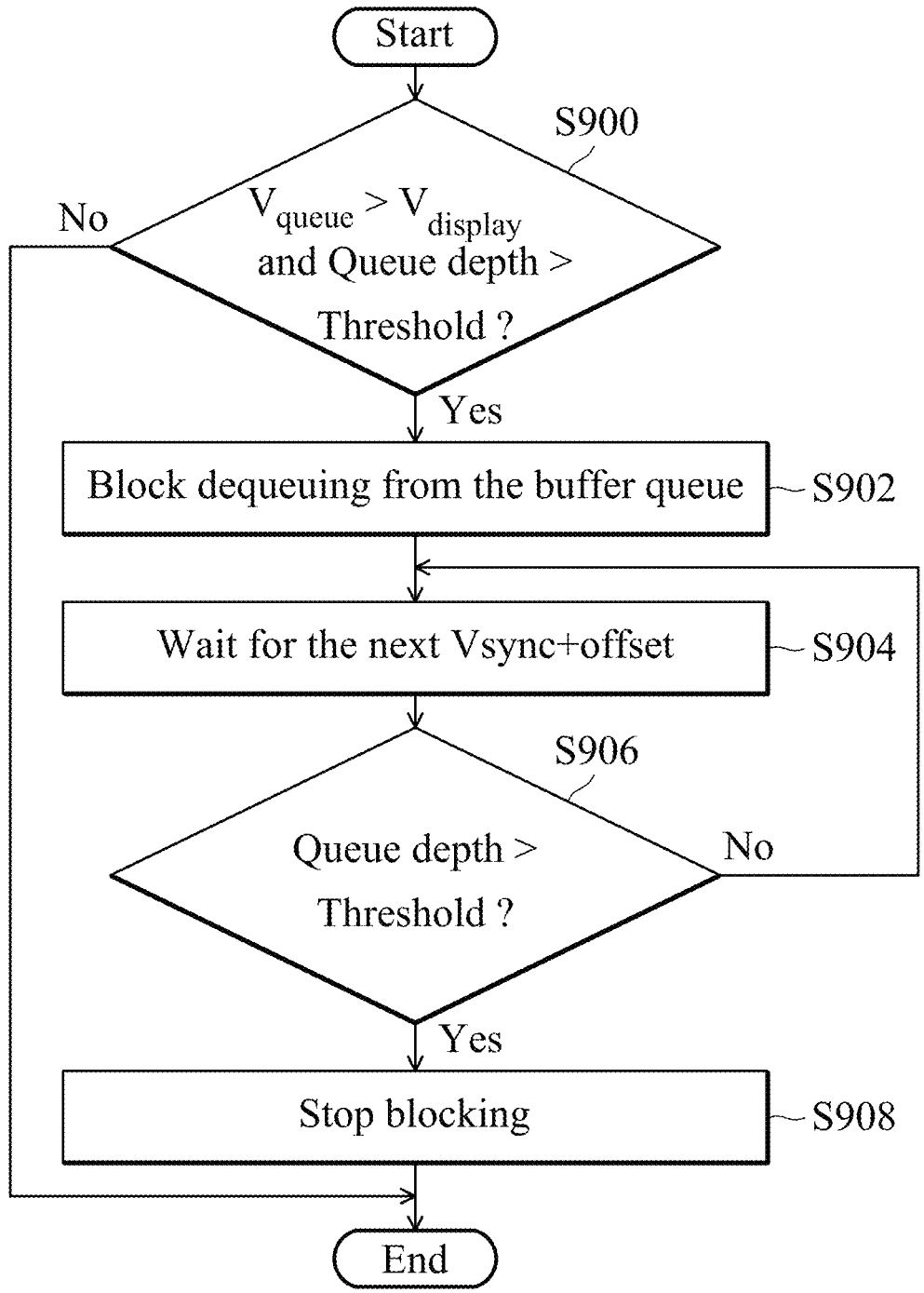
FIG. 9 shows a flow chart of the frame rhythm control module 116 executing the pending control method in accordance with some embodiments of the present invention.

FIG. 9 shows a flow chart of the frame rhythm control module 116 executing the pending control method in accordance with some embodiments of the present invention. As shown in FIG. 9, the strategy selection module 114 determines whether the queue velocity $V_{queue}$ is higher than the display velocity $V_{display}$ and the queue depth of the buffer queue 132 exceeds the depth threshold in step S900. If the answer in step S900 is yes, the frame rhythm control module 116 blocks dequeuing the current frame from the buffer queue 132 in step S902, so that the queue velocity $V_{queue}$ is decreased. In step S904, the frame rhythm control module 116 waits for the next synchronous trigger time 120 (marked as Vsync-SF in FIG. 8) plus an offset value. Then, in step S906, the strategy selection module 114 determines whether the queue depth of the buffer queue 132 exceeds the depth threshold. If the answer in step S906 is yes, the frame rhythm control module 116 stop blocking in step S908. In some embodiments, if the answer in step S900 is no, the frame rhythm control module 116 does not execute the pending control method. If the answer in step S906 is no, the frame rhythm control module 116 keeps waiting for the next synchronous trigger time 120 plus the offset value in step S904.

Figure 10:
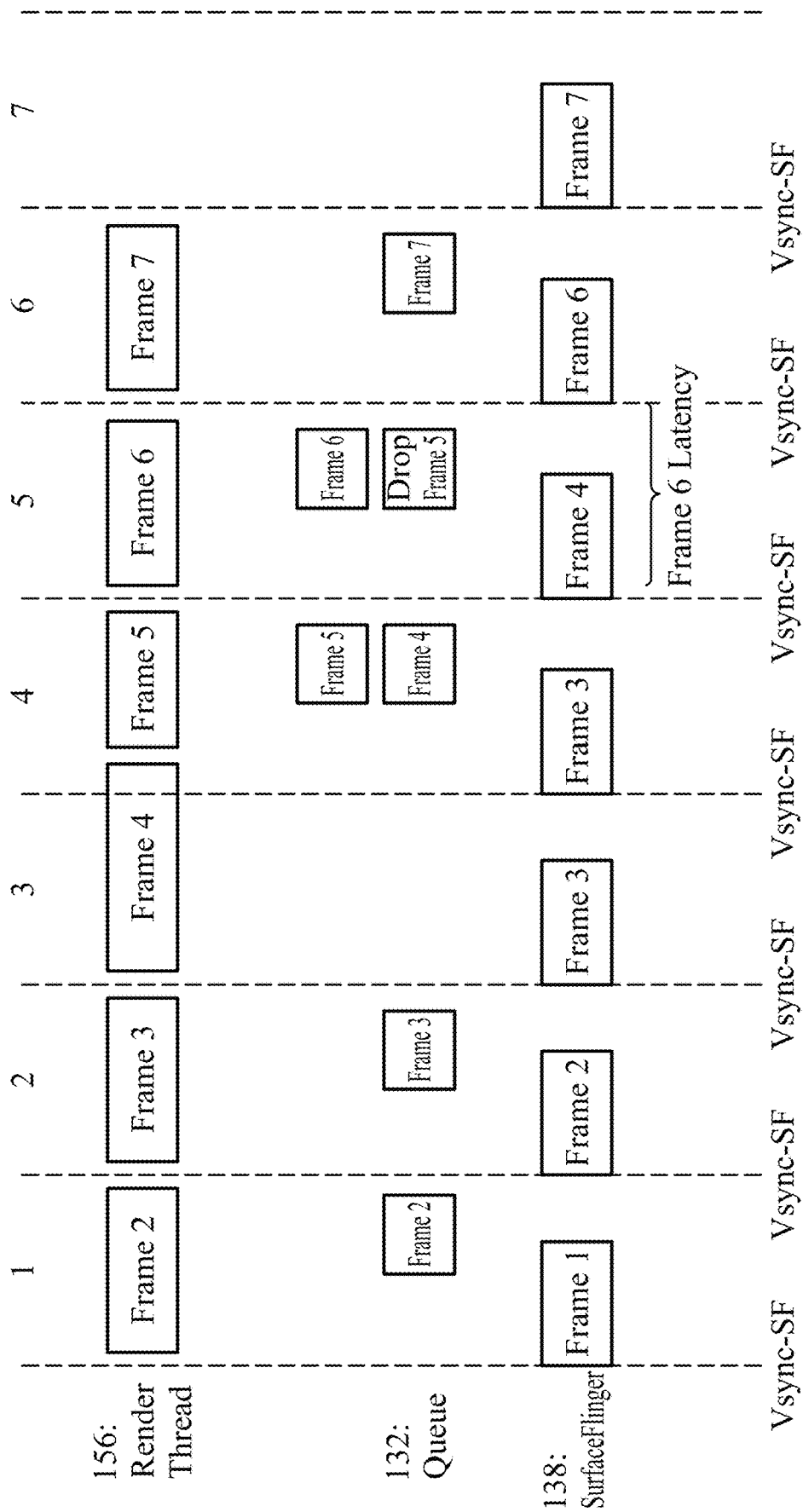
FIG. 10 shows a time sequence diagram of the frame rhythm control module 116 executing a drop control method in accordance with some embodiments of the present invention.

FIG. 10 shows a time sequence diagram of the frame rhythm control module 116 executing a drop control method in accordance with some embodiments of the present invention. As shown in FIG. 10, in period 1, the SurfaceFlinger 138 dequeues Frame 1 from the buffer queue 132. Then, the render thread 156 of the application 150 queues Frame 2 in the buffer queue 132. In period 2, the SurfaceFlinger 138 dequeues Frame 2 from the buffer queue 132. Then, the render thread 156 of the application 150 queues Frame 3 in the buffer queue 132. In period 3, the SurfaceFlinger 138 dequeues Frame 3 from the buffer queue 132. Since the frame consumed period of Frame 4 is longer than a consumed period threshold, the render thread 156 of the application 150 cannot queue Frame 4 in the buffer queue 132 in period 3. In period 4, since there is no data frame in the buffer queue 132 and Frame 3 has been dequeued, the SurfaceFlinger 138 may display Frame 3 in periods 3 and 4. The render thread 156 of the application 150 first queues Frame 4 in the buffer queue 132, and second queues Frame 5 in the buffer queue 132.

In period 5, the SurfaceFlinger 138 dequeues Frame 4 from the buffer queue 132. The render thread 156 of the application 150 queues Frame 6 in the buffer queue 132. Next, the frame rhythm control module 116 starts the drop control method to drop Frame 5 from the buffer queue 132 based on the queue depth being higher than the depth threshold. In period 6, the SurfaceFlinger 138 dequeues Frame 6 from the buffer queue 132. The render thread 156 of the application 150 queues Frame 7 in the buffer queue 132. In period 7, the SurfaceFlinger 138 dequeues Frame 7 from the buffer queue 132. The Frame 6 latency which is obviously improved is marked out. Without starting the drop control method, the queue depth of the buffer queue 132 may remain at 2. The frame rhythm control module 116 decreases the queue depth by scarifying fluency to improve latency.

In some embodiments, when the processor 102 (that is, strategy selection module 114) detects that the queue velocity $V_{queue}$ is equal to the display velocity $V_{display}$, and the processor 102 (that is, the frame rhythm control module 116) starts the drop control method to drop the data frame that has been stored in buffer queue 132 when a new frame is queued in the buffer queue 132.

In some embodiments, when the processor 102 (that is, strategy selection module 114) detects that the queue velocity $V_{queue}$ is higher than the display velocity V display and the queue depth of the buffer queue 132 exceeds the depth threshold and the frame consumed period of the data frame is higher than the consumed period threshold, the processor 102 (that is, the frame rhythm control module 116) starts the drop control method to drop the data frame that has been stored, so that the queue depth of the buffer queue 132 may be decreased to the depth threshold.

Figure 11:
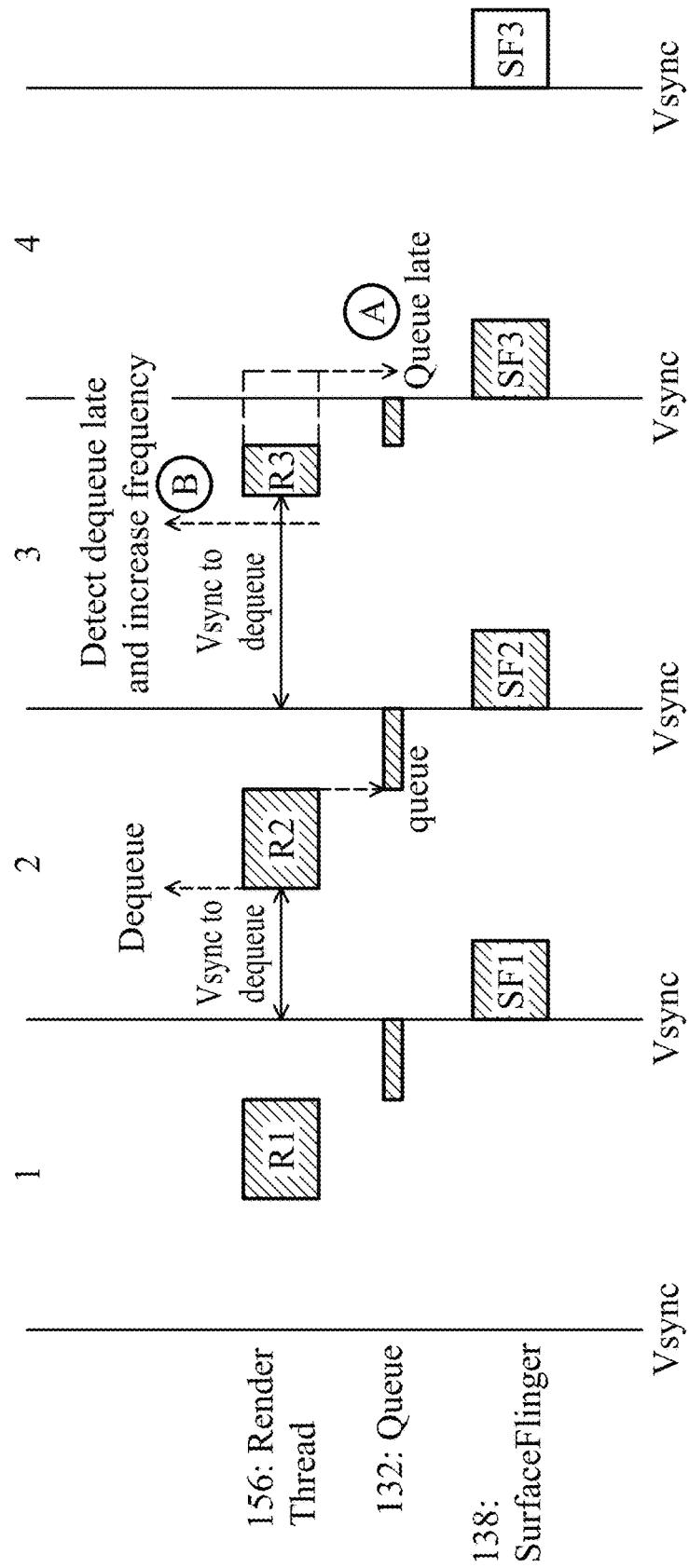
FIG. 11 shows a time sequence diagram of the frame rhythm control module 116 executing a computility control method in accordance with some embodiments of the present invention.

FIG. 11 shows a time sequence diagram of the frame rhythm control module 116 executing a computility control method in accordance with some embodiments of the present invention. As shown in FIG. 11, in period 1, the render thread 156 of the application 150 queues Frame R1 in the buffer queue 132. In period 2, the SurfaceFlinger 138 dequeues Frame R1 from the buffer queue 132, marked as SF1, during the solid line (Vsync) between periods 1 and 2 and the dash-up arrow (Dequeue). A time difference $\Delta T1_{dequeue-Vsync}$ (marked as (Vsync to dequeue) in period 2) is defined between the solid line (Vsync) between periods 1 and 2 and the dash-up arrow (Dequeue) in period 2. In period 2, the render thread 156 of the application 150 queues Frame R2 in the buffer queue 132 at the dash-down arrow (queue) in period 2. In period 3, the SurfaceFlinger 138 dequeues Frame R2 from the buffer queue 132, marked as SF2, during the solid line (Vsync) between periods 2 and 3 and the dash-up arrow (Dequeue). A time difference $\Delta T2_{dequeue-Vsync}$ (marked as (Vsync to dequeue) in period 3) is defined between the solid line Vsync between periods 2 and 3 and the dash-up arrow (Dequeue) in period 3. The strategy selection module 114 detects that the time difference $\Delta T2_{dequeue-Vsync}$ is longer that the time difference $\Delta T1_{dequeue-Vsync}$ (when buffer dequeue time is late, condition B is met), and infers that the render thread 156 of the application 150 cannot queue Frame R3 in the buffer queue 132 in period 3, but can only queue Frame R3 in the buffer queue 132 in period 4 (that is, when condition A is met, the buffer queue time may be late). Therefore, the frame rhythm control module 116 starts the computility control method to increase the computing frequency of the processor 102 (when computing frequency is increased, condition B is met). So that the render thread 156 of the application 150 can queue Frame R3 in the buffer queue 132 in period 3.

Figure 12:
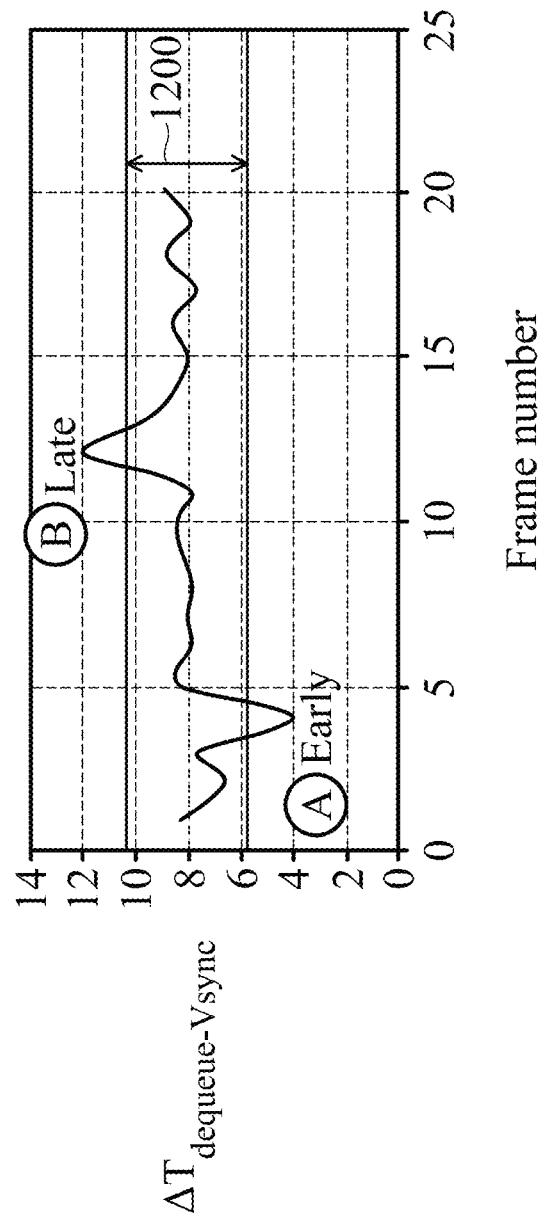
FIG. 12 is a schematic diagram of change of a time difference between the buffer dequeue time and the synchronous trigger time in accordance with some embodiments of the present invention.

FIG. 12 is a schematic diagram of change of a time difference between the buffer dequeue time and the synchronous trigger time in accordance with some embodiments of the present invention. The vertical axis represents the time difference $\Delta T_{dequeue-Vsync}$ between the buffer dequeue time 206 and the synchronous trigger time 120. The horizontal axis represents the frame number. A fluctuation stable range 1200 is marked. In some embodiments of FIG. 12, the strategy selection module 114 detects that the queue velocity $V_{queue}$ is equal to the display velocity $V_{display}$, and determines whether jitter problems are about to occur based on the rhythm changes (that is, the change of time difference $\Delta T_{dequeue-Vsync}$). The strategy selection module 114 monitors the change of time difference $\Delta T_{dequeue-Vsync}$ to determine whether to start the computility control method. The strategy selection module 114 monitors changing trends of the time difference $\Delta T_{dequeue-Vsync}$ of N data frames in an application window. For example, when condition A is met, the buffer dequeue time 206 may be early, the frame rhythm control module 116 starts the computility control method to decrease the computing frequency of the processor 102. When condition B is met, the buffer dequeue time 206 may be late, the frame rhythm control module 116 starts the computility control method to increase the computing frequency of the processor 102.

Figure 13:
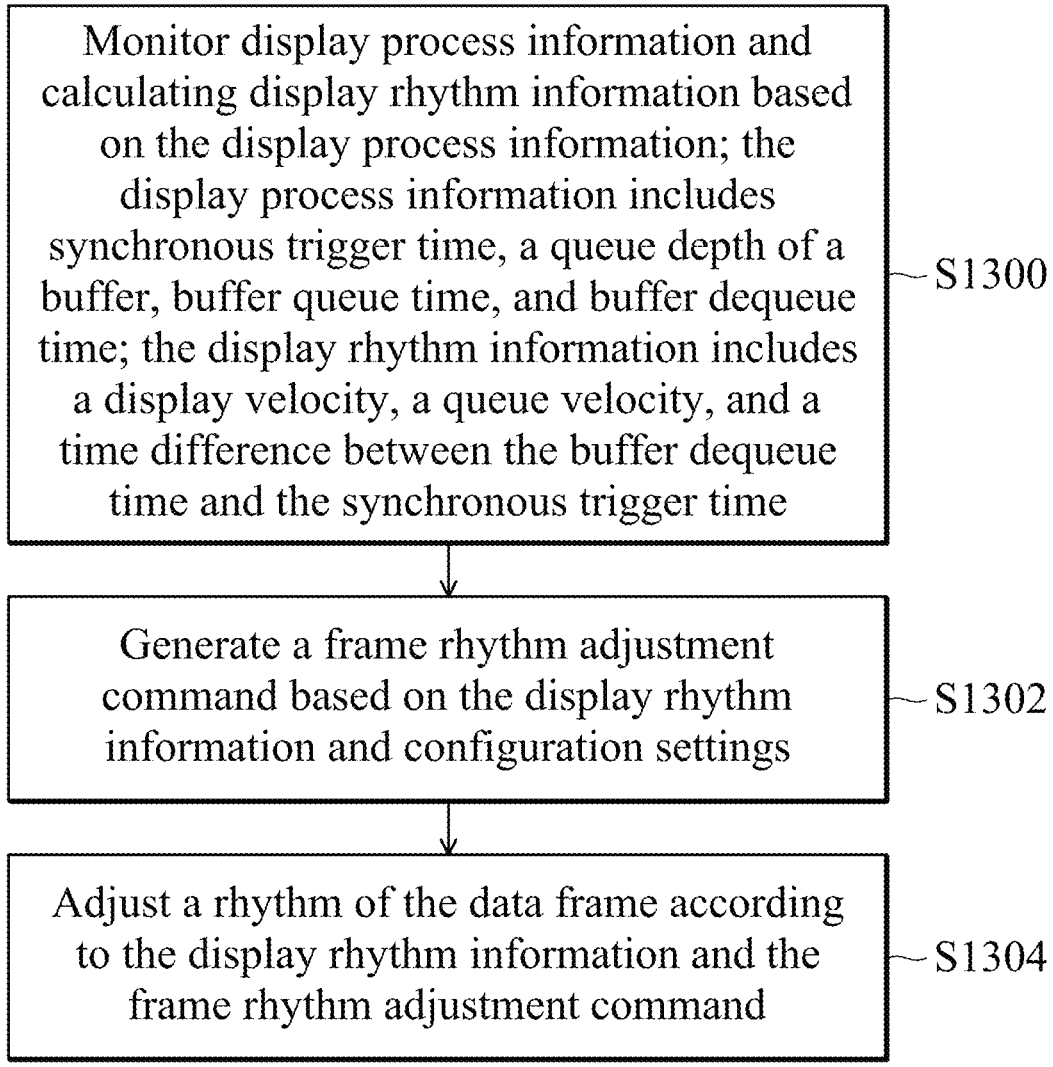
FIG. 13 is a flow chart of a method to decrease touch delay based on scene configuration in accordance with some embodiments of the present invention.

FIG. 13 is a flow chart of a method to decrease touch delay based on scene configuration in accordance with some embodiments of the present invention. The method to decrease touch delay based on scene configuration is applied to electronic device 100 in FIG. 1. A data frame that has been rendered is queued into the buffer at buffer queue time. The data frame is dequeued from the buffer at buffer dequeue time. The data frame is displayed on the display at synchronous trigger time. The method includes the following steps. Display process information is monitored and display rhythm information is calculated based on the display process information. The display process information includes the synchronous trigger time, a queue depth of the buffer, the buffer queue time, and the buffer dequeue time. The display rhythm information includes a display velocity, a queue velocity, and a time difference between the buffer dequeue time and the synchronous trigger time (step S1300). A frame rhythm adjustment command is generated based on the display rhythm information and configuration settings (step S1302). The rhythm of the data frame is adjusted according to the display rhythm information and the frame rhythm adjustment command (step S1304).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a display;
a buffer, having a queue depth; and
a processor, electrically connected to the buffer and the display, configured to queue a data frame that has been rendered into the buffer at buffer queue time, dequeue the data frame from the buffer at buffer dequeue time, and display the data frame on the display at synchronous trigger time;
wherein the processor is configured to monitor display process information and calculate display rhythm information based on the display process information, generate a frame rhythm adjustment command based on the display rhythm information and configuration settings, and adjust a rhythm of the data frame according to the display rhythm information and the frame rhythm adjustment command;
wherein the display process information comprises the synchronous trigger time, the queue depth, the buffer queue time, and the buffer dequeue time;
wherein the display rhythm information comprises a display velocity, a queue velocity, and a time difference between the buffer dequeue time and the synchronous trigger time.

2. The electronic device as claimed in claim 1, wherein the processor monitors a synchronous signal to obtain the synchronous trigger time, and obtains a buffer queue name, the queue depth, the buffer queue time, and the buffer dequeue time through an application programming interface (API) of the buffer.

3. The electronic device as claimed in claim 1, wherein the processor calculates the display velocity using the following equation:

$$V_{display} = (N-1) \bigg/ \sum\nolimits_{i=1}^{n} (T_n vsync - T_{n-1} vsync);$$

wherein $V_{display}$ is the display velocity, N is the number of data frames that the processor calculates, n is an nth data frame, $T_n vsync$ is the synchronous trigger time in the nth data frame, and $T_{n-1} vsync$ is the synchronous trigger time in the n–1th data frame.

4. The electronic device as claimed in claim 1, wherein the processor calculates the queue velocity using the following equation:

$$V_{queue} = (N-1) \Big/ \sum_{i=1}^{n} (T_n queue - T_{n-1} queue);$$

wherein $V_{queue}$ is the queue velocity, N is the number of data frames that the processor calculates, n is an nth data frame, $T_n$queue is the buffer queue time in the nth data frame, and $T_{n-1}$queue is the buffer queue time in the n−1th data frame.

5. The electronic device as claimed in claim 2, wherein the processor parses an XML configuration to read the configuration settings, monitors an update of the configuration settings, receives the display process information and the display rhythm information, selects a window rhythm control strategy, and generates the frame rhythm adjustment command; wherein the configuration settings comprise application scenes, rhythm status, judgment conditions, thresholds, and adjustment methods.

6. The electronic device as claimed in claim 5, wherein the adjustment methods comprise a computility control method, a pending control method, and a drop control method.

7. The electronic device as claimed in claim 5, wherein the processor identifies an application window through the buffer queue name to match the window rhythm control strategy in the configuration settings, and selects the adjustment methods for the current application scenes according to the window rhythm control strategy and the rhythm status.

8. The electronic device as claimed in claim 6, wherein the window rhythm control strategy comprises a default strategy, a smooth strategy, a low latency strategy, and a custom strategy.

9. The electronic device as claimed in claim 8, wherein when the default strategy is adopted and the processor detects that the display velocity is equal to the queue velocity, the processor starts the computility control method to increase a computing frequency of the processor when the time difference between the buffer dequeue time and the synchronous trigger time is changed.

10. The electronic device as claimed in claim 8, wherein when the default strategy is adopted and the processor detects that the display velocity is higher than the queue velocity, the processor starts the pending control method to decrease the queue velocity when the queue depth exceeds a depth threshold.

11. The electronic device as claimed in claim 10, wherein when the default strategy is adopted and the processor detects that the display velocity is higher than the queue velocity, the processor first starts the drop control method to drop some of the data frames in the buffer, and second the processor starts the pending control method to decrease the queue velocity when a frame consumed period of the data frame is higher than a consumed period threshold.

12. The electronic device as claimed in claim 8, wherein when the smooth strategy is adopted and the processor detects that the display velocity is not equal to the queue velocity, the processor starts the pending control method to decrease the queue velocity when the queue depth exceeds the depth threshold.

13. The electronic device as claimed in claim 12, wherein when the smooth strategy is adopted and the processor detects that the display velocity is equal to the queue velocity, the processor starts the computility control method to increase the computing frequency of the processor when the time difference between the buffer dequeue time and the synchronous trigger time is higher than a time difference threshold.

14. A method to decrease touch delay based on scene configuration, applied to an electronic device comprising a display, a buffer, and a processor, comprising:
queuing a data frame that has been rendered into the buffer at buffer queue time;
dequeuing the data frame from the buffer at buffer dequeue time;
displaying the data frame on the display at synchronous trigger time;
monitoring display process information and calculating display rhythm information based on the display process information; wherein the display process information comprises the synchronous trigger time, a queue depth of the buffer, the buffer queue time, and the buffer dequeue time; wherein the display rhythm information comprises a display velocity, a queue velocity, and a time difference between the buffer dequeue time and the buffer queue time;
generating a frame rhythm adjustment command based on the display rhythm information and configuration settings, and
adjusting the rhythm of the data frame according to the display rhythm information and the frame rhythm adjustment command.

15. The method as claimed in claim 14, wherein the step of monitoring the display process information comprises:
monitoring a synchronous signal to obtain the synchronous trigger time; and
obtaining a buffer queue name, the queue depth, the buffer queue time, and the buffer dequeue time through the application programming interface (API) of the buffer.

16. The method as claimed in claim 14, further comprising:
calculating the display velocity using the following equation, $$V_{display} = (N-1) \Big/ \sum_{i=1}^{n} (T_n vsync - T_{n-1} vsync);$$

wherein $V_{display}$ is the display velocity, N is the number of data frames that the processor calculates, n is an nth data frame, $T_n$vsync is the synchronous trigger time in the nth data frame, and $T_{n-1}$vsync is the synchronous trigger time in the n−1th data frame.

17. The method as claimed in claim 14, further comprising:
calculating the queue velocity using the following equation, $$V_{queue} = (N-1) \Big/ \sum_{i=1}^{n} (T_n queue - T_{n-1} queue);$$

wherein $V_{queue}$ is the queue velocity, N is the number of data frames that the processor calculates, n is an nth data frame, $T_n$queue is the buffer queue time in the nth data frame, and $T_{n-1}$queue is the buffer queue time in the n−1th data frame.

18. The method as claimed in claim 15, wherein the step of generating the frame rhythm adjustment command based on the display rhythm information and configuration settings comprises:
parsing an XML configuration to read the configuration settings;
monitoring an update of the configuration settings;

receiving the display process information and the display rhythm information;

selecting a window rhythm control strategy; and generating the frame rhythm adjustment command;

wherein the configuration settings comprise application scenes, rhythm status, judgment conditions, thresholds, and adjustment methods.

19. The method as claimed in claim 18, wherein the adjustment methods comprise a computility control method, a pending control method, and a drop control method.

20. The method as claimed in claim 18, wherein the steps of selecting the window rhythm control strategy and generating the frame rhythm adjustment command comprise:

identifying an application window through the buffer queue name to match the window rhythm control strategy in the configuration settings; and selecting the adjustment methods for the current application scenes according to the window rhythm control strategy and the rhythm status.

* * * * *